Patented July 13, 1937

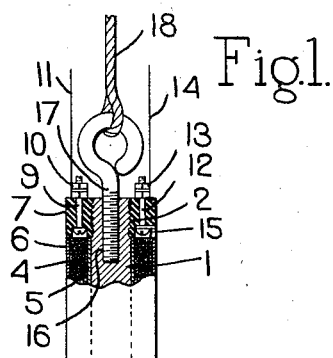
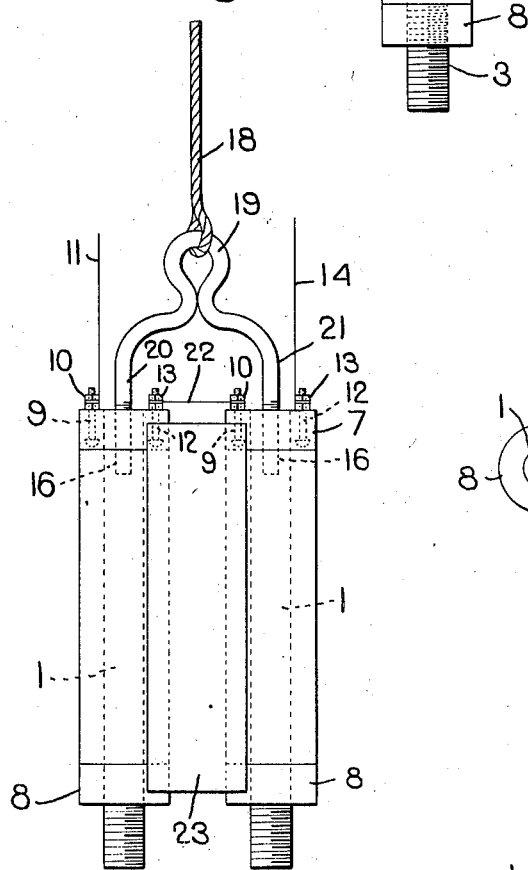
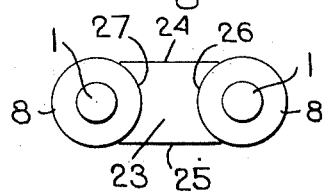

2,087,034

UNITED STATES PATENT OFFICE 2,087,034

ELECTROMAGNETIC FISHING TOOL

Arvi Jameson, West Quincy, Mass.

Application August 27, 1935, Serial No. 38,069

3 Claims. (Cl. 175—367)

This invention relates to improvements in electromagnetic fishing tools for extracting broken drill bits of steam drills, jack hammers, and the like, from holes in granite or granite quarries.

One of the objects of the invention is to provide a fishing tool of the character described of simple, economical and efficient construction.

When it is desired to remove blocks of predetermined size and shape from a quarry, or to divide blocks of granite and the like along definite lines, holes are drilled along the desired line at predetermined intervals, and a channel bar or tool is then reciprocated in such manner as to cut or break down the partition between adjacent drill holes.

A further object of the invention is to provide a fishing tool for removing broken channels from the space between the drill holes.

A further object of the invention is to provide a tool which may be selectively employed either to remove the drills from the circular drill hole or remove the channels. This is accomplished by providing two similar cylindrical electromagnets arranged in parallelism with their cores united at one end by a suitable conductor for the magnetic flux, thereby forming in effect a horseshoe magnet, the lower ends of which are adapted to engage the channel bar when lowered into the recess in which it is lodged, and upon removal of the fishing tool to extract the channel bar or other broken device.

Desirably the member connecting the cores of the electromagnets is of general U-shape and provided with a central eye by means of which a cable may be attached to it and the ends of the U-shaped member are detachably connected by screw threaded engagement with the cores of the respective magnets.

By reason of this construction the electromagnets can be removed from the supporting member and an eye-bolt screwed into one of the electromagnet cores, so that it may be selectively used to fish broken drill bits from the cylindrical hole.

These and other objects and features of the invention will more fully appear from the following description and the accompanying drawing and will be particularly pointed out in the claims.

In the drawing:

Fig. 1 is a side elevation, partly broken away and shown in section, illustrating a preferred form of electromagnetic fishing tool for extracting drill bits and the like from a single bore;

Fig. 2 is a side elevation of a fishing tool comprising two electromagnets arranged in parallelism and connected by a U-shaped supporting member adapted for fishing broken channel bars and the like from the space between adjacent drill holes, the device desirably being provided with means for maintaining the electromagnets in parallelism; and, Fig. 3 is a bottom view of the device illustrated in Fig. 2.

The electromagnetic fishing tool illustrated in Fig. 1 comprises a core 1, preferably of soft iron, having a portion of its upper end provided with screw threads 2 and its lower end similarly provided with screw threads 3. A coil 4 of wire is wound upon the core 1 with a suitable insulation 5, such as several layers of waxed paper, between the coil and the core. The coil is also provided with an external wrapping or wrappings 6 of suitable insulating material, such an layers of wrapping twine and muslin, impregnated with a suitable waterproofing composition. The coil is clamped upon the core between an upper head 7 and a lower head 8 of insulating material, such as hard rubber, the heads 7 and 8 being internally screw threaded to engage the screw threads 2 and 3 upon the respective ends of the core.

An electric terminal or binding post 9, which is connected to one end of the coil, extends through the head and is provided with suitable nuts 10 by means of which an electric conductor 11 may be detachably connected to it. Another binding post 12 is mounted in the head and is provided with nuts 13 by means of which the electric conductor 14 may be connected to it. The terminals or binding posts 9 and 12 are in the form of bolts extending upwardly through the upper head and are provided at their lower ends with heads adapted to be seated upon the shoulders of countersunk recesses and to clamp the ends of the coil against the bases of the countersunk recesses. The bolts extend through the head in parallelism with the axis of the coil and lie well within the periphery of the head so that the electric conductors, which are clamped to the upper ends of the bolts by the nuts 10 and 13, will not be likely to be scored by frictional contact with the walls of the drill hole as the fishing tool is lowered into or withdrawn from the drill hole. In order to facilitate assembling of the coil upon the core, a lower portion of the upper head is cut out to provide a recess 15 which will permit access to the head of the terminal 12, thereby enabling the end of the coil to be readily connected to the binding post.

The upper end of the core is provided with an axial bore 16 having a screw threaded wall adapted to receive the screw threaded shank of an eye-bolt 17 to which a cable 18 for raising and lowering the fishing tool may be attached. The lower screw threaded end 3 of the core desirably extends a considerable distance below the lower head 8 in order that the magnetic force will draw the broken bit or fragment toward it and into engagement with it if such fragment is not in a position to be directly engaged by the exposed end of the core.

In operation, the fishing tool is lowered into the drill hole or bore containing the broken drill bit or fragment thereof, and an electric current conducted through the coil by the conductors 11 and 14. As soon as the exposed lower screw threaded end 3 of the magnet approaches or contacts with the broken drill bit, it will become attached to it and can be readily extracted by the withdrawal of the fishing tool.

The fishing tool illustrated in Fig. 3 desirably comprises cylindrical electromagnets of the same construction as that illustrated in Fig. 1 arranged in parallelism and spaced apart a suitable distance. These electromagnets are detachably connected to a supporting member adapted to conduct the magnetic flux and provided centrally with means by which the cable may be attached to it. The preferred form of supporting member illustrated in Fig. 2 comprises a generally U-shaped bar of iron or steel having a central loop 19 by means of which the cable 18 may be secured to it and parallel legs 20 and 21 having screw threaded ends adapted to engage the screw threaded walls of the bores 16 of the respective cores. In this construction the terminal 12 of one magnet is connected to the terminal 9 of the other by a suitable conductor 22, so that the electric current, which enters through the conductor 11, will pass first through the magnet at the left, thence through the conductor 22, and thence through the other coil at the right in the same direction, and finally to the return conductor 14 to the generator.

By reason of this construction a magnet of the horseshoe type is produced, thereby providing the well known additional strength which may be required to remove a heavier channel bar portion from the space between adjacent drill holes.

Inasmuch as the magnetic force produced by the passage of the current through the coils of the adjacent electromagnet tends to draw the lower ends or poles of the cores toward each other, a spacing device is located between the adjacent coils. This spacing device desirably comprises a rigid member 23 of insulating material, preferably wood, of somewhat less thickness than the diameters of the coils, with the front and rear walls 24 and 25 in parallelism, and the edges 26 and 27 curved to conform to the cylindrical surfaces of the electromagnets. This separating member desirably tightly fits between the coils and when the electric current is turned on, is securely held in place during the lowering of the tool into and removal of the same from the passage between the drill holes.

In the operation of the device the fishing tool is lowered into the space between the drill holes until the exposed ends of one or both cores engage the broken channel bar. The fishing tool is then raised and if but one of the ends of the fishing tool happens to be engaged by the channel bar it will soon be tilted in such manner as to engage both of the cores and upon raising the fishing tool will be extracted.

It will be understood that the particular embodiments of the invention shown in the accompanying drawing are of an illustrative character and are not restrictive of the scope and meaning of the following claims.

Having thus described the invention, what is claimed as new, and desired to be secured by Letters Patent, is:

1. An electromagnetic fishing tool for drills, drill channels, and the like, comprising two electromagnets each having a core surrounded by a cylindrical coil, and having at its upper end a screw threaded axial bore, a U-shaped iron supporting member of smaller cross sectional area than that of said coils having a central loop, by means of which it may be suspended, and parallel screw threaded legs detachably mounted respectively in the axial bores of said cores and said legs being so constructed as to maintain said magnets substantially in parallelism and spaced apart a predetermined distance, thereby providing a horseshoe type of electromagnet, and means for conducting an electric current through said coils in series.

2. An electromagnetic fishing tool for drills, drill channels, and the like, comprising two electromagnets each having a core surrounded by a cylindrical coil, and having at its upper end a screw threaded axial bore, a resilient U-shaped iron supporting member having a central loop and downwardly extending screw threaded parallel legs detachably mounted respectively in the axial bores of said cores, and so constructed as to maintain said magnets substantially in parallelism, thereby providing a horseshoe type of electromagnet, means for conducting an electric current through said coils in series, and means interposed between said coils to prevent the lower ends of the coils from being drawn toward each other by magnetic force when the electric current is supplied to said coils to maintain the same in parallelism.

3. An electromagnetic fishing tool for drills, drill channels, and the like, comprising two electromagnets each having a core surrounded by a cylindrical coil, and having at its upper end a screw threaded axial bore, a resilient U-shaped iron supporting member having a central loop and downwardly extending screw threaded legs detachably mounted respectively in the axial bores of said cores, and so constructed as to maintain said magnets substantially in parallelism, thereby providing a horseshoe type of electromagnet, means for conducting an electric current through said coil in series, and a separator of insulating material having cylindrically concave edges interposed between said coils and frictionally held thereby acting to maintain said coils in axial parallelism.

ARVI JAMESON.